US006572362B2

(12) United States Patent  
Boyd

(10) Patent No.: US 6,572,362 B2  
(45) Date of Patent: Jun. 3, 2003

(54) APPARATUS FOR INJECTION MOLDING IN ALTERNATE PLANES

(75) Inventor: Thomas John Boyd, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 126 days.

(21) Appl. No.: 09/920,501

(22) Filed: Aug. 1, 2001

(65) Prior Publication Data

US 2003/0026866 A1 Feb. 6, 2003

(51) Int. Cl.$^7$ ............................................... B29C 45/17
(52) U.S. Cl. .................................. 425/574; 264/328.11
(58) Field of Search ............................... 425/190, 574, 425/451, 453; 264/328.11

(56) References Cited

U.S. PATENT DOCUMENTS

| 3,034,175 A | 5/1962 | Hehl |
| 3,068,520 A | 12/1962 | Hehl |
| 3,176,176 A | 3/1965 | Kobayashi |
| 3,350,746 A | 11/1967 | Blumer |
| 3,609,815 A | 10/1971 | Rudolf et al. |
| 4,158,381 A | 6/1979 | Michelson .................. 164/226 |
| 4,547,140 A | 10/1985 | Davis ........................ 425/138 |
| 4,589,839 A | 5/1986 | Kurumaji et al. ........... 425/547 |
| 4,613,475 A | 9/1986 | Hettings ..................... 264/328 |
| 4,632,651 A | 12/1986 | von der Ohe et al. ...... 425/135 |
| 4,695,238 A | 9/1987 | Taniguchi ................... 425/145 |
| 4,950,146 A | 8/1990 | Adachi ....................... 425/149 |
| 4,976,603 A | 12/1990 | Disimone ................... 425/556 |
| 5,007,816 A | 4/1991 | Hehl .......................... 425/135 |
| 5,112,212 A | 5/1992 | Akselrud et al. ........... 425/557 |
| 5,112,213 A | 5/1992 | Oas ............................. 425/562 |
| 5,122,051 A | 6/1992 | Joyner ........................ 425/556 |
| 5,131,226 A | 7/1992 | Hendry ........................ 60/418 |
| 5,153,007 A | 10/1992 | Watkins ..................... 425/143 |
| 5,183,621 A | * 2/1993 | Yukihiro et al. ........ 264/328.11 |
| 5,253,999 A | 10/1993 | Kosuge ...................... 425/575 |
| 5,286,186 A | 2/1994 | Brown et al. ............... 425/164 |
| 5,334,009 A | 8/1994 | Urbanek et al. ............ 425/164 |
| 5,360,332 A | * 11/1994 | Hehl .......................... 425/190 |
| 5,435,715 A | 7/1995 | Campbell ................... 425/576 |
| 5,490,772 A | 2/1996 | Gaigl ......................... 425/126 |
| 5,902,611 A | 5/1999 | Stegmaier ................... 425/145 |
| 5,975,872 A | 11/1999 | Raines et al. ............... 425/136 |
| 6,023,829 A | 2/2000 | Boyd et al. ................. 29/401.1 |
| 6,193,499 B1 | 2/2001 | Klaus et al. ................ 425/557 |
| 6,203,311 B1 | 3/2001 | Dray .......................... 425/562 |
| 6,241,508 B1 | 6/2001 | John et al. .................. 425/559 |

FOREIGN PATENT DOCUMENTS

| FR | 2187511 | 1/1974 |
| FR | 2783742 | 3/2000 |
| GB | 960308 | 6/1964 |
| JP | 63-168321 | * 7/1988 ............ 264/328.11 |

* cited by examiner

Primary Examiner—Tim Heitbrink  
(74) Attorney, Agent, or Firm—Nancy T Krawczyk; Richard B O'Planick

(57) ABSTRACT

Discloses is an apparatus for injection molding permitting movement of the injection molding machine in multiple planes. The apparatus has a frame and an injection molding machine mounted within the frame. Located on both the frame and the injection molding machine are a plurality of interlocking rails and rail bearings. The movement of the rails in the rail bearings permits the injection molding machine to move relative to the frame. The frame is a two piece interlocking frame, the two pieces being capable of movement relative to each other.

5 Claims, 8 Drawing Sheets

APPARATUS FOR INJECTION MOLDING IN ALTERNATE PLANES

FIELD OF THE INVENTION

The present invention is directed to an injection molding apparatus. Specifically, the injection molding apparatus is constructed to permit the injector to introduce molding material into a mold along either a vertical mold line or a horizontal mold line.

BACKGROUND OF THE INVENTION

Injection molding machines for injecting molding materials into molds are well known in the manufacturing industry. The injection molding machine is designed to inject the molding material into an associated mold. The injection direction occurs in either the horizontal direction or the vertical direction, the direction being determined by the construction of the machine. The mold to be used in combination with the injection machine is designed to coordinate with the injection direction of the machine.

However, it is not always possible for the mold configuration to coordinate with the injection direction of the machine. Due to the mass and weight of the injection molding machine and the relatively greater ease of modifying the mold, in such circumstances, modifications are made to the mold. Such modifications usually include providing additional flow channels to the mold, thereby increasing the distance the molding material must travel before entering the mold. Increasing the distance between the injection nozzle and the mold cavity is not always desirable depending upon the molding material cure characteristics.

SUMMARY OF THE INVENTION

The present invention is directed to an injection molding machine permitting movement of the injection molding machine in multiple planes.

The disclosed apparatus has a frame and an injection molding machine mounted within the frame. Located on both the frame and the injection molding machine are a plurality of interlocking rails and rail bearings. The movement of the rails in the rail bearings permits the injection molding machine to move relative to the frame.

The frame in which the molding machine is mounted is a two piece frame. The two frame structures are interlocking and are also capable of movement relative to each other.

In one aspect of the disclosed invention, the injection molding machine is moveably mounted within a first of the two interlocking frame structures. The first frame structure is moveably mounted within the second frame structure. The movement of the injection molding machine within the first frame structure differs from the movement of the first frame structure within the second frame structure. If the injection molding machine moves in a vertical direction within the first frame structure, then the first frame structure moves in a horizontal direction within the second frame structure.

In another aspect of the invention, the apparatus has at least one power means to move the injection molding machine in the desired direction of movement. The power means is a hydraulic or pneumatic cylinder.

In another aspect of the invention, the injection molding machine has an injection nozzle and an injection extension block is mounted onto the injection nozzle. The injection extension block has a bent flow channel within it so that any material flowing out of the injection nozzle exits the extension block in a different plane than it entered the extension block.

BRIEF DESCRIPTION OF THE DRAWINGS

The invention will be described by way of example and with reference to the accompanying drawings in which.

DETAILED DESCRIPTION OF THE INVENTION

Figure 1:
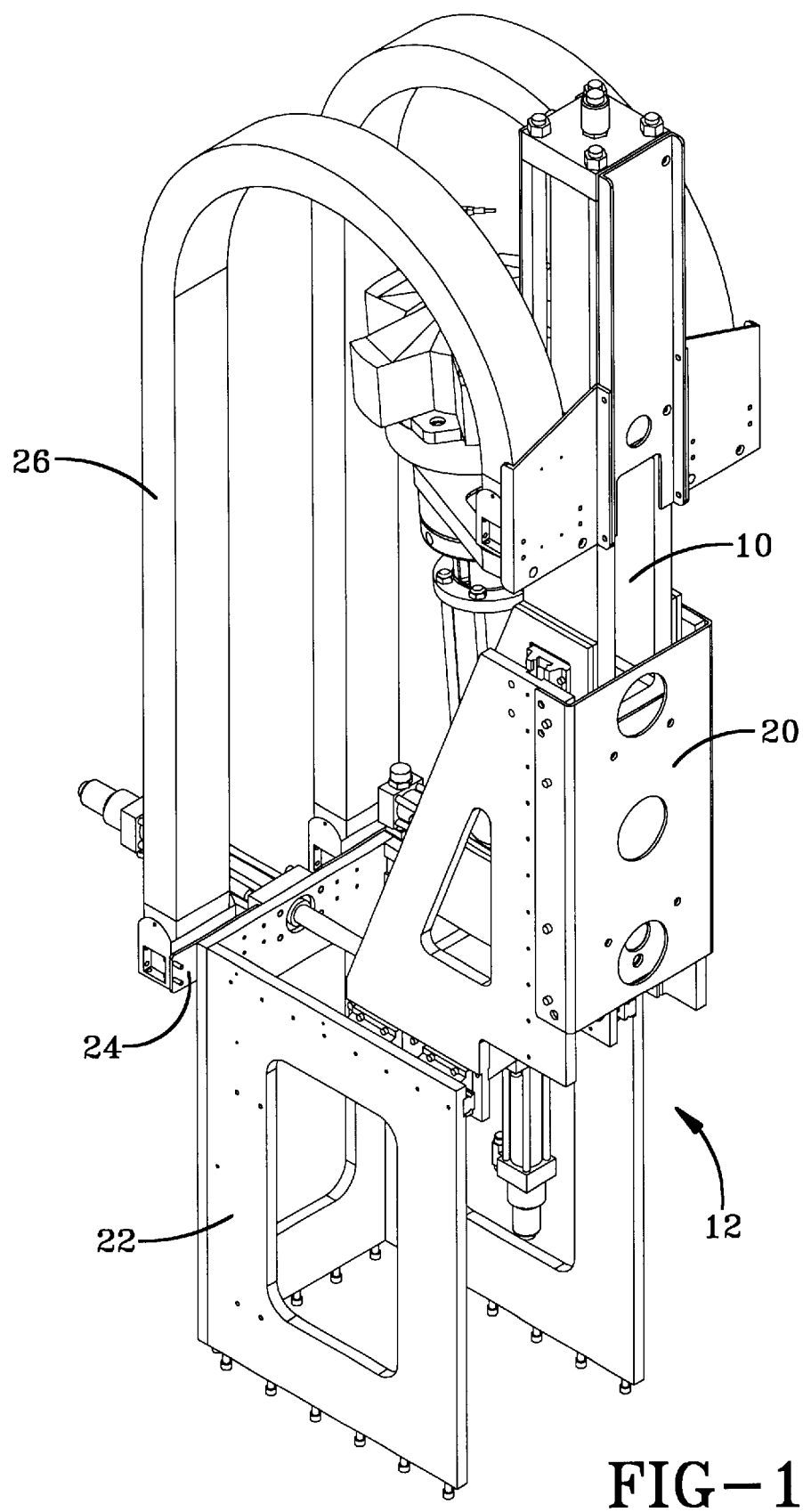
FIG. 1 is a perspective view of a mounted injection molding machine.
Figure 2:
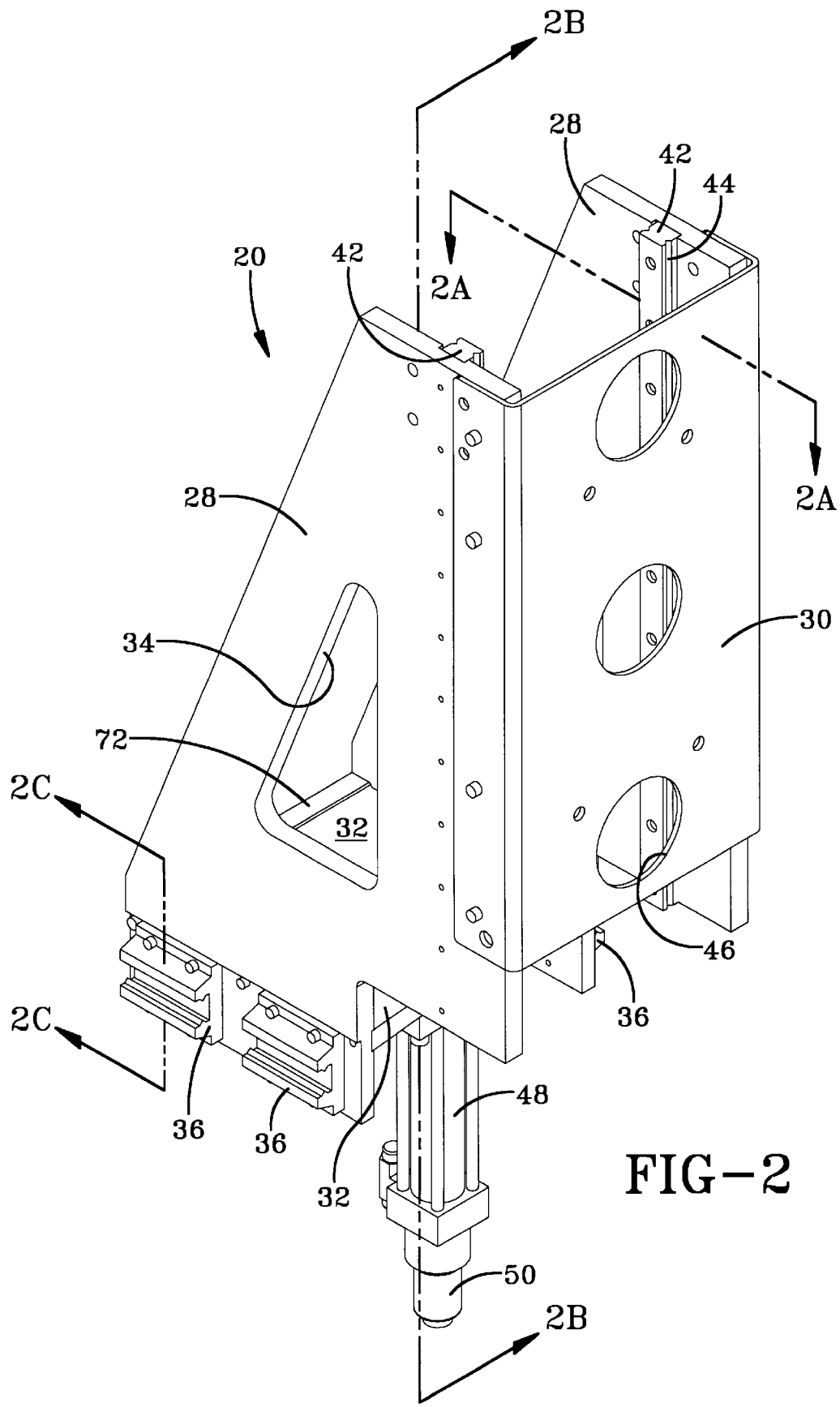
FIG. 2 is the top moving structure.
Figure 2A:
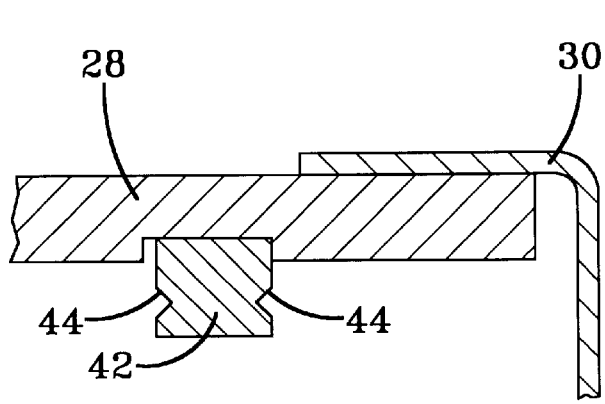
FIG. 2a is a cross sectional view along line 2a—2a of FIG. 2.
Figure 2C:
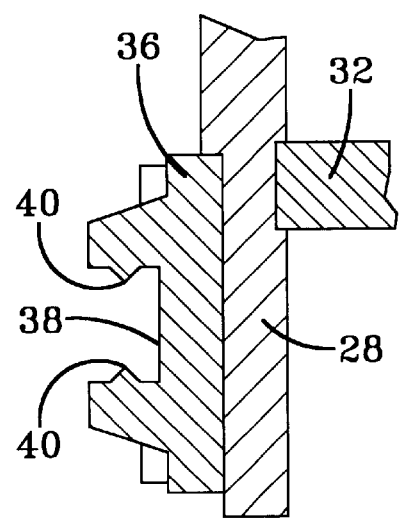
FIG. 2c is a cross section view along line 2c—2c of FIG. 2.
Figure 2B:
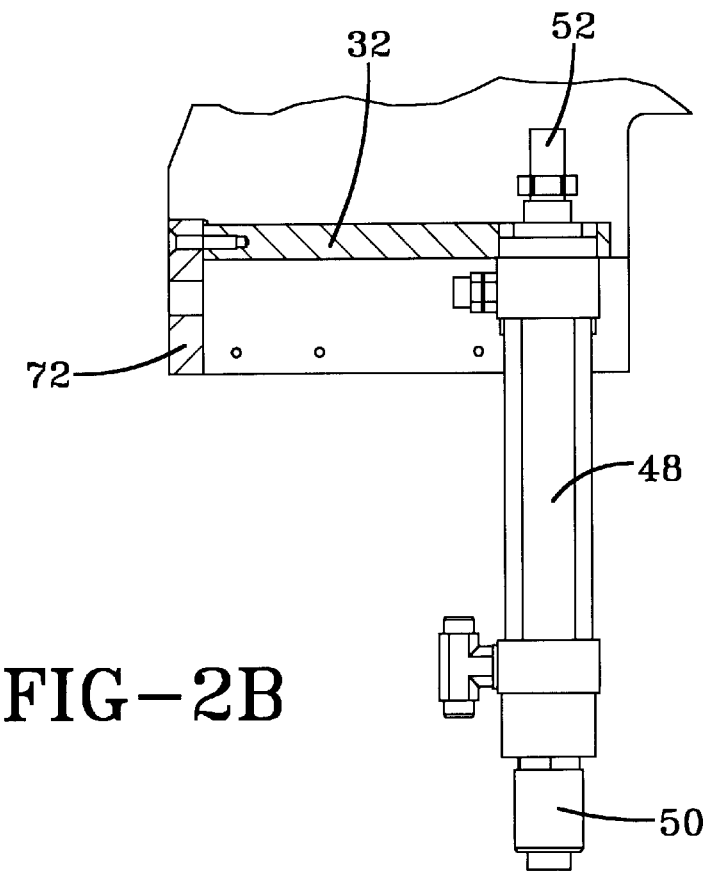
FIG. 2b is a cross sectional view along line 2b—2b of FIG. 2.

FIG. 1 illustrates an injection molding machine 10 mounted in a two piece frame 12 which permits the position of the injection molding machine 10 to be readily altered. The injection molding machine 10 is mounted in a vertical position for vertical injection molding. The injection molding machine 10 is a two-stage machine with the internal cavity 14, the associated plunger 16 that shoots the molding material into the mold, and the nozzle 18 through which the molding material flows mounted at a zero degree angle relative to the vertical plane. The injection molding machine 10 illustrated is similar to the machine disclosed in a commonly assigned patent application, DN2001126, filed the same day as this application. The use of this particular injection molding machine is merely exemplary; other constructions of injection molding machines may be employed in the present invention.

The injection molding machine 10 is mounted within a first piece of the two piece frame 12, the top moving structure 20 which is itself mounted on the base structure 22. Extending from support plates 24 on the base structure 22 to an upper position on the injection molding machine 10 are a pair of flexible tracks 26 through which any necessary supply lines for the injection molding machine 10 may be run.

The top moving structure 20 is more clearly illustrated in FIGS. 2, 2a, 2b, and 2c. The top moving structure 20 has a pair of side plates 28, a brace plate 30, and a base plate 32. The side plates 28 have a quasi-triangular shape with cut outs 34 to reduce the overall weight of the plates 28. The plates 28 may have any suitable configuration such as a square, rectangle, triangle, or other polygon. Along the lower most edge and on the outer sides of the side plates 28 are pairs of linear rail bearings 36. A single continuous rail bearing 36 may be provided as opposed to the two bearings illustrated. The rail bearings 36 have a central groove 38 running along the length of the rail bearing with a central convex tang 40 along both sides of the groove 38, see FIG. 2c.

Figure 3:
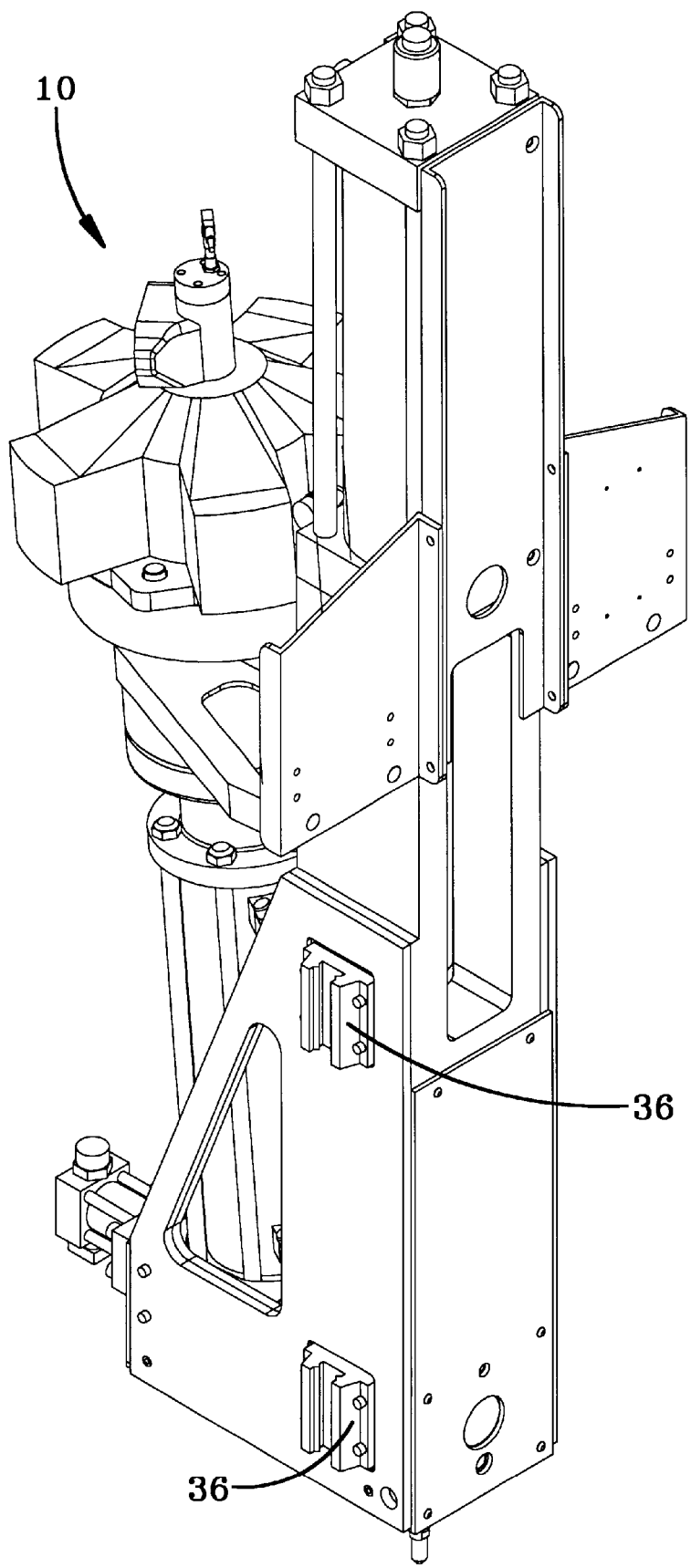
FIG. 3 is a perspective view of the injection molding machine.

Located on the inside of the plates 28 are vertical rails 42. The rails 42 extend at least the majority of the height of the plate 28, and preferably, are continuous along the total height of the plate 28. A concave groove 44 runs along both sides of the rails 42, see FIG. 2a. When the injection molding machine 10 is mounted onto the structure 12, the rail bearings 36 travel on rails 42 mounted on both sides of the injection molding machine 10, see FIG. 3. The rail bearings 36 are similar to the rail bearings 36 on the lower edges of the side plates 28. The convex tang 40 on both sides of the central groove 38 fit into the concave grooves 44 along both sides of the rails 42. The interaction of the rails 42 and the rail bearings 36 permits the injection molding machine 10 to move in the vertical plane.

The brace plate 30 extends between the two side plates 38, providing support to the top moving structure 20. Similar to the side plates 38, the brace plate 30 may have cut outs 46 to reduce the overall weight of the plate 30. The total cross-sectional area of the cut outs 46 should be such that the strength of the plate 30 and the support it provides are not comprised. The cut outs 46 also provide access to the injection molding machine 10 mounted in the top moving structure 20.

Figure 4:
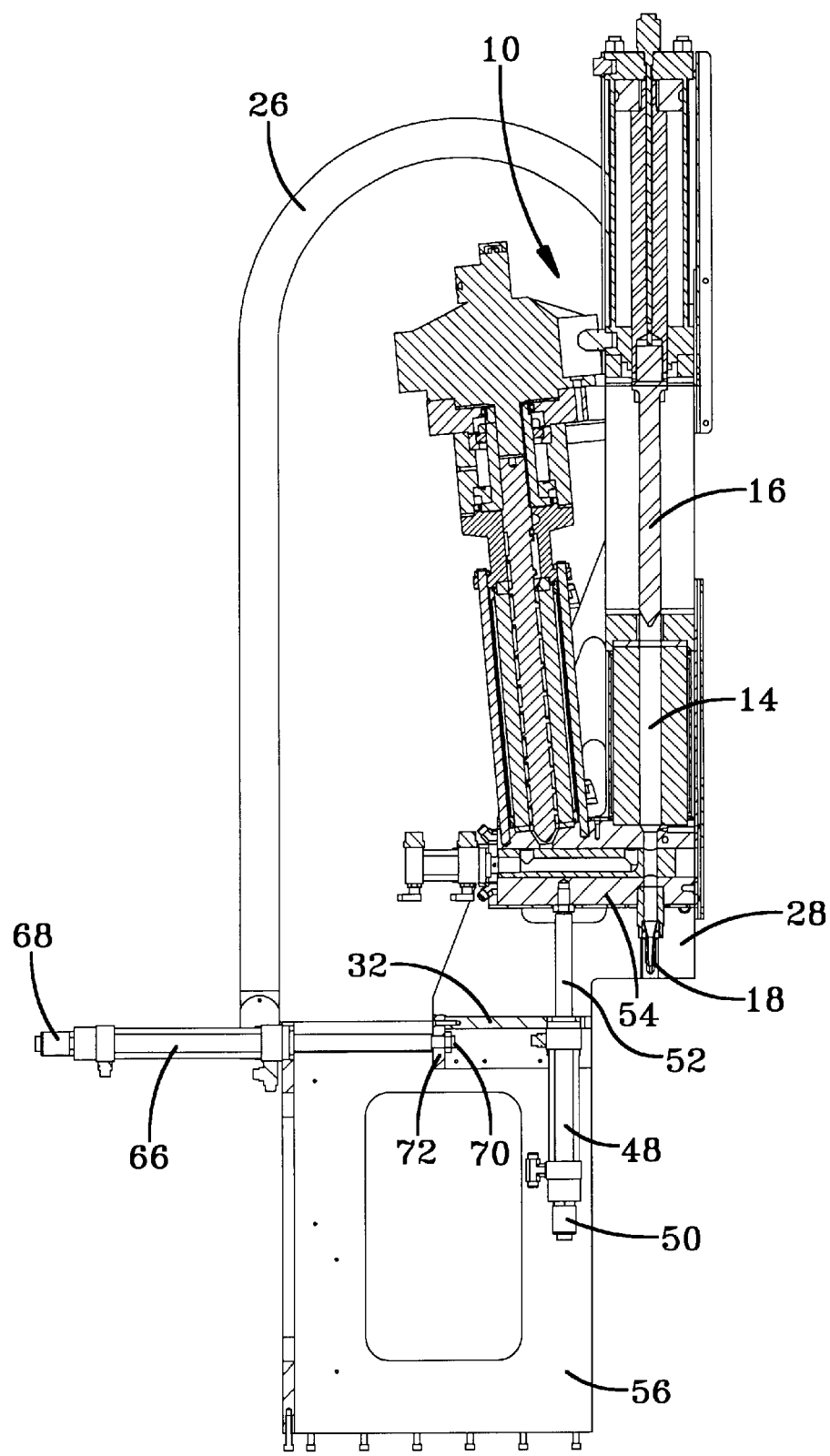
FIG. 4 is a cross sectional view of the mounted injection molding machine.

The base plate 32 extends between the side plates 28. Mounted within the base plate 32 is a hydraulic cylinder 48 for vertically moving the injection molding machine 10. At the lower end of the hydraulic cylinder 48 is a linear variable displacement transducer (lvdt) 50 that provides input to the operator as to the position of the hydraulic cylinder 48 and thus the position of the injection molding machine 10. The hydraulic cylinder 48 has an inner cylinder 52 which is fixedly secured to the leading face 54 of the injection molding machine 10, see FIG. 4.

The exact position of the hydraulic cylinder 48 in the base plate 32 is dependant on the injection molding machine 10. The inner cylinder 52 is mounted as close as possible to the nozzle to reduce the twisting load on the machine 10. Because of the weight being born by the cylinder 48, the mounted cylinder 48 is braced along the underside of the base plate 32.

Figure 5:
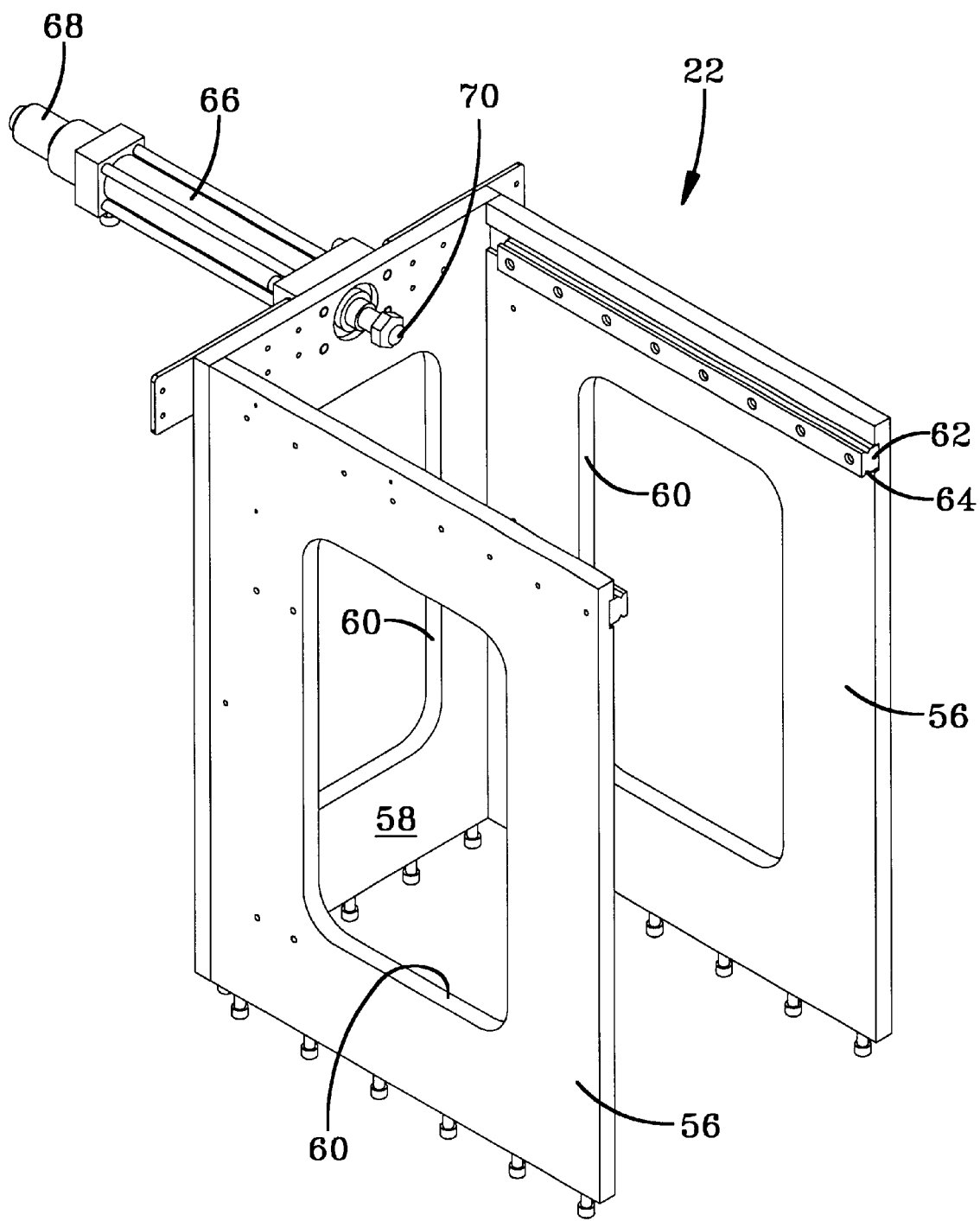
FIG. 5 is the base structure.

The top moving structure 20 is mounted onto the base structure 22. The base structure 22 has pair of side plates 56 and a back plate 58, see FIG. 5. The plates 56, 58 have cut-outs 60 to reduce the weight of the structure 22, but without compromising the strength integrity of the structure 22. Each side plate 56 has a horizontally extending rail 62 along the inside edge of the plate 56. The rail 62 has a concave groove 64 along each side. The concave grooves 64 are complimentary to the convex tang 40 of the linear rail bearings 36 on the outside of the top moving structure side plates 28.

Mounted along the upper edge of the back plate is a hydraulic cylinder 66. An lvdt 68 provides input to the operator as to the position of the hydraulic cylinder 66 and the horizontal position of the injection molding machine 10. The leading edge 70 of the inner cylinder 66 is secured to the vertical extension 72 of the base plate 32 of the top moving structure 20, see FIG. 4. The interaction between the rails 62, the linear rail bearings 36, and the action of the cylinder 66 move the injection molding machine 10 horizontally.

The rails 42, 62 and the rail bearings 36 are all illustrated as being mounted onto the plates 28, 56 and the injection molding machine 10. However, the rails 42, 62 or the rail bearings 36 may be formed as part of the plate.

While the cylinders 48, 66 are referenced as hydraulic cylinders, they may also be other conventional types of cylinders such as pneumatic cylinders. If need be, the injection molding machine 10 may be moved within the top structure 20 by hand or the top structure 20 may be moved within the base structure 22 by hand.

The cylinders 48, 66 and the different sets of rails 42, 62 and linear rail bearings 36 permit movement of the injection molding machine 10 in both the horizontal and the vertical plane. Movement in both directions enables the use of molds having any size and configurations. Depending on the nozzle configuration of the machine 10, the injection molding direction may be either vertical or horizontal.

While the injection molding machine is illustrated as being mounted with its main axis oriented in a vertical direction, it may be mounted with its main axis oriented in the horizontal direction. In such case, the same movement would be achieved when the injection molding machine 10 is mounted movable within a first piece of the two piece frame 12 for movement in a first direction, and then the first piece is mounted moveable within the second piece of the two piece frame 12 for movement in the second direction.

Figure 6:
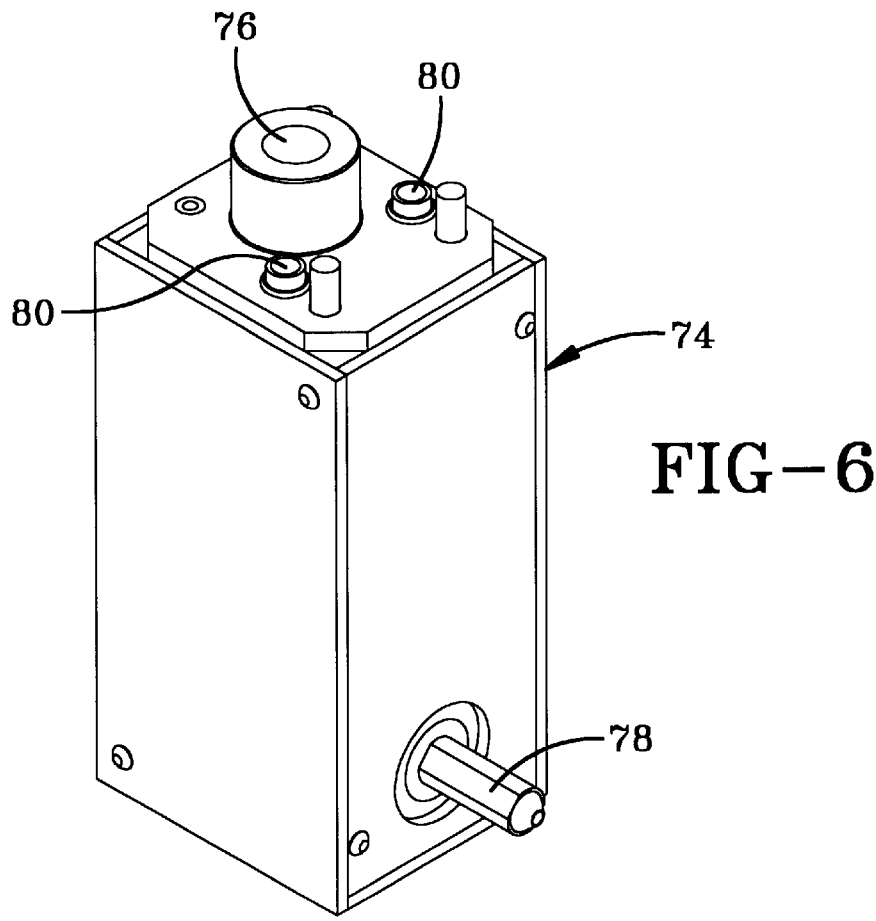
FIG. 6 is a perspective view of the molding extension block.
Figure 7:
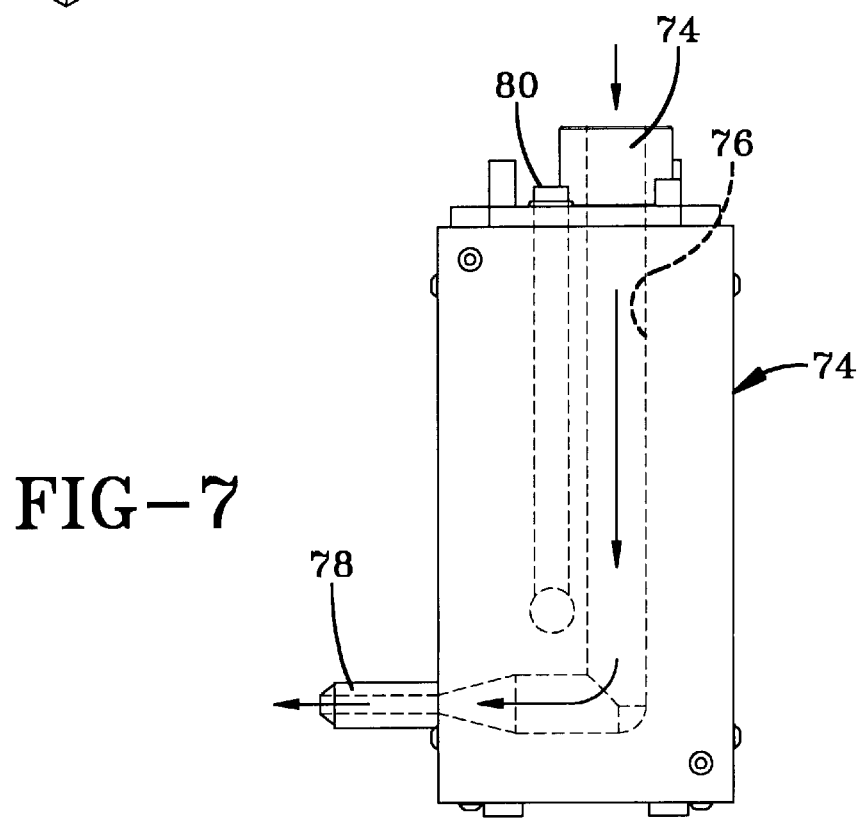
FIG. 7 is a cross sectional view of the molding extension block.

If an incompatibility between the injection direction of the machine 10 and the configuration of the mold cannot be avoided, an extension of the injection molding machine nozzle 18 may be secured to the machine 10. The nozzle extension block 74, see FIGS. 6 and 7, alters the molding material flow from vertical to horizontal or vise versa depending on the primary orientation of the molding machine 10.

The nozzle extension block 74 has an entry sized to correspond with the injection nozzle 18. A passage 76 through the block 74 bends to alter the flow direction of any material traveling through the block 74. An injection nozzle 78 is located at the passage exit. When the block 74 is mounted onto the machine 10, by means of extensions 80, heat is supplied to the block 74 via passageways 82 through the block 74. Similar to the machine 10, the block 74 is insulated to prevent heat loss.

Figure 8:
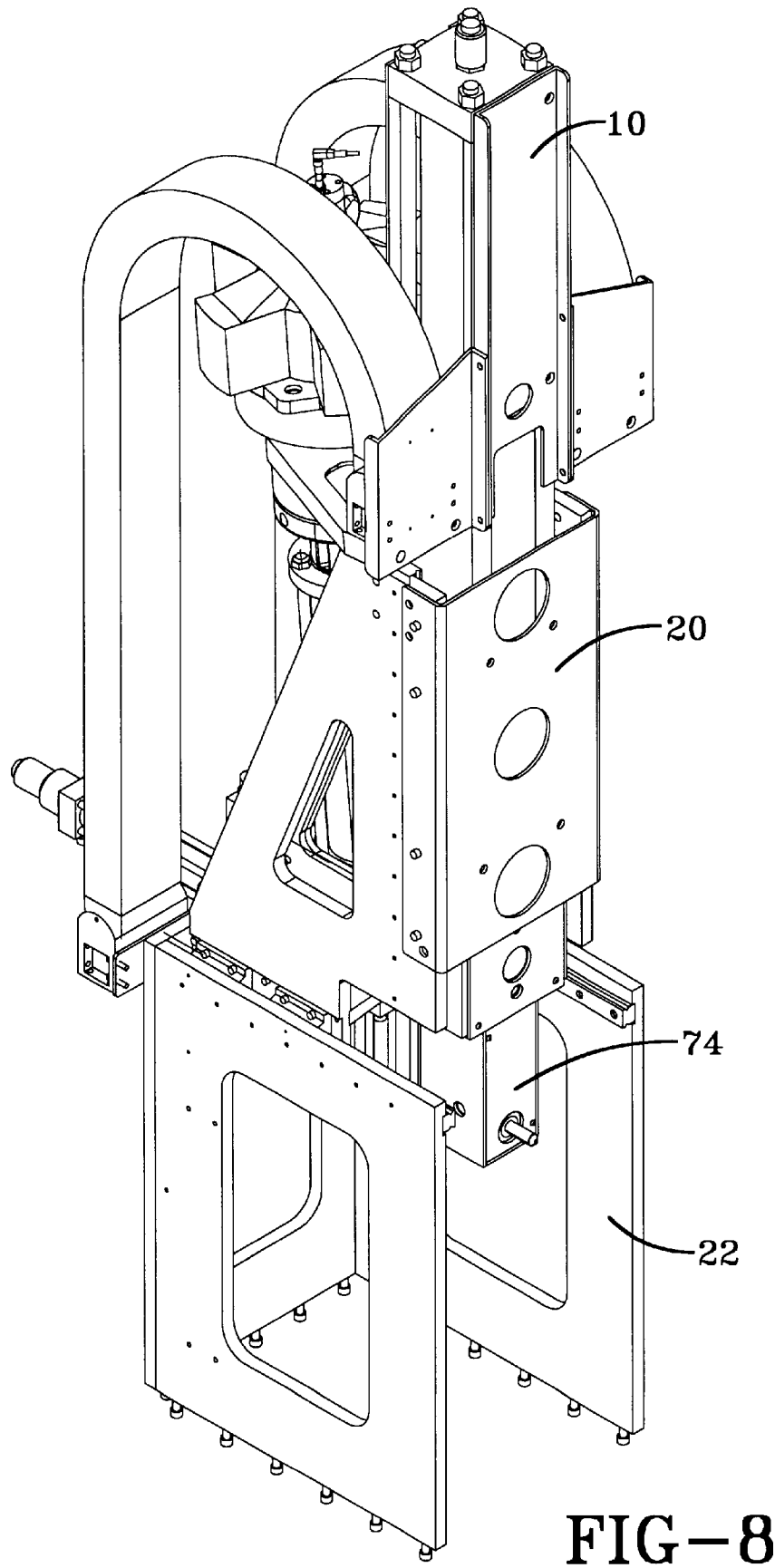
FIG. 8 is a perspective view of an injection molding machine employing horizontal plane injection.

When the block 74 is mounted onto the illustrated injection molding machine 10, see FIG. 8, the injection direction is now horizontal, as opposed to the vertical injection direction, see FIG. 1. As can also be seen in FIG. 8, the machine 10 is at an extreme horizontal position and can be moved forward so that the injection nozzle 78 may contact a mold.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is therefore to be understood that changes can be made in the particular embodiments described which will be within the full intended scope of the invention as defined by the following appended claims.

What is claimed is:

1. An apparatus for injection molding, the apparatus comprising a frame and an injection molding machine mounted within the frame, the apparatus being characterized by:
   interlocking rails and rail bearings mounted on the frame and the injection molding machine respectively,
   the movement of the rail bearings on the rails permitting the injection molding machine to move relative to the frame, wherein the frame is a two piece frame comprising two interlocking frame structures, the structures being capable of movement relative to each other.

2. An apparatus as set forth in claim 1 wherein the injection molding machine is moveably mounted within a first of the two interlocking frame structures, and the first frame structure is moveably mounted within the second frame structure.

3. An apparatus as set forth in claim 1 wherein the apparatus has at least one power means to move the injection molding machine in the desired direction of movement.

4. An apparatus as set forth in claim 3 wherein the power means is a hydraulic cylinder.

5. An apparatus as set forth in claim 1 wherein the injection molding machine has an injection nozzle and the apparatus is further comprised of an injection extension block mounted onto the injection nozzle, the injection extension block comprising a bent flow channel.

* * * * *